United States Patent
Waggoner

(10) Patent No.: US 10,358,358 B1
(45) Date of Patent: Jul. 23, 2019

(54) WASTEWATER TREATMENT APPARATUS AND SYSTEM

(71) Applicant: Neil Don Waggoner, Guthrie, OK (US)

(72) Inventor: Neil Don Waggoner, Guthrie, OK (US)

( * ) Notice: Subject to any disclaimer, the term of this patent is extended or adjusted under 35 U.S.C. 154(b) by 51 days.

(21) Appl. No.: 15/359,283

(22) Filed: Nov. 22, 2016

Related U.S. Application Data

(60) Provisional application No. 62/371,894, filed on Aug. 8, 2016, provisional application No. 62/259,399, filed on Nov. 24, 2015.

(51) Int. Cl.

| | |
|---|---|
| *C02F 1/12* | (2006.01) |
| *C02F 1/18* | (2006.01) |
| *B01D 1/18* | (2006.01) |
| *B01D 1/14* | (2006.01) |
| *B01D 5/00* | (2006.01) |
| *C02F 1/04* | (2006.01) |
| *B01D 1/30* | (2006.01) |
| *C02F 103/10* | (2006.01) |

(52) U.S. Cl.
CPC ............ *C02F 1/12* (2013.01); *B01D 1/14* (2013.01); *B01D 1/18* (2013.01); *B01D 1/30* (2013.01); *B01D 5/006* (2013.01); *B01D 5/0009* (2013.01); *B01D 5/0072* (2013.01); *C02F 1/043* (2013.01); *C02F 1/048* (2013.01); *C02F 1/18* (2013.01); *C02F 2103/10* (2013.01); *C02F 2201/008* (2013.01)

(58) Field of Classification Search
CPC ........ B01D 1/14–20; B01D 1/30; B01D 1/305; B01D 5/006; B01D 5/0072; C02F 1/04; C02F 1/043; C02F 1/048; C02F 1/12; C02F 1/18

See application file for complete search history.

(56) References Cited

U.S. PATENT DOCUMENTS

| | | | | |
|---|---|---|---|---|
| 5,582,680 | A * | 12/1996 | Vankouwenberg | C02F 1/048 110/235 |
| 2011/0139378 | A1* | 6/2011 | Lakatos | C02F 9/00 159/4.01 |
| 2011/0140457 | A1* | 6/2011 | Lakatos | B01D 1/14 290/1 R |
| 2014/0061958 | A1* | 3/2014 | Sparrow | B01D 1/16 261/140.1 |
| 2015/0157953 | A1* | 6/2015 | Duesel, Jr. | B01D 1/0058 95/24 |
| 2016/0362307 | A1* | 12/2016 | Shiner | B01D 1/0082 |

\* cited by examiner

*Primary Examiner* — Renee Robinson
(74) *Attorney, Agent, or Firm* — Phillips Murrah PC; Martin G. Ozinga

(57) ABSTRACT

The present invention is a mobile evaporation, separation, and concentration unit for water with dissolved solids whereby solids may be removed by misting in a tank thereby separating solids from the wastewater and accumulating the solids for disposal.

3 Claims, 4 Drawing Sheets

WASTEWATER TREATMENT APPARATUS AND SYSTEM

CROSS-REFERENCE TO RELATED APPLICATIONS

Priority is claimed from provisional patent application U.S. Ser. No. 62/259,399 filed on Nov. 24, 2015 and U.S. Ser. No. 62/371,894 filed on Aug. 8, 2016, both incorporated by reference herein.

BACKGROUND OF THE INVENTION

1. Field of the Invention

In general, the present invention relates to an apparatus, system and method of treating wastewater with solids therein. More particularly, the present invention provides a mobile evaporation, separation, and concentration unit for water with dissolved solids whereby solids may be removed.

2. Description of the Prior Art

Oil and gas drilling operations result in large volumes of salt water and generally otherwise contaminated water. A major concern facing the industry is the ever growing and constant concern with environmental impact of oil and gas production coupled with the ever-increasing need to maximize efficiency and recovery. Prior art methods that were perfectly acceptable just years ago are now politically and environmentally unfriendly as well as wasteful in hindsight. Whereas, it was acceptable to allow untreated by products from well production to be released into the environment, it is not considered a viable economic or environmentally sound method to date.

The industry is typically faced with either treating the water for reuse or disposal underground. Salt water has been traditionally injected into underground geological formations but an increase in earthquake activity has been linked to salt water injection. It is known to treat the wastewater for general reuse and return to the environment although the amount of wastewater to be treated and cost of treating can be prohibitive.

The balance of cost, time and operational efficiency has created a need for new and improved treatment systems for wastewater. The above discussed limitations in the prior art is not exhaustive. Thus, there is a need for an apparatus, method and system to separate the components from wastewater that maximizes efficiency and is environmentally friendly. The current invention provides an inexpensive, time saving, more reliable apparatus, system and method where the prior art fails.

SUMMARY OF THE INVENTION

In view of the foregoing disadvantages inherent in the known types of wastewater treatment associated with well operations and other operations now present in the prior art, the present invention provides a new and improved wastewater treatment apparatus, system and method of use, which may also be removably positioned to oil and gas wells. As such, the general purpose of the present invention, which will be described subsequently in greater detail, is to provide a new and improved wastewater treatment application, which has all the advantages of the prior art devices and none of the disadvantages.

To attain this, the present invention essentially treats wastewater by removing solids and may comprise but is not limited to a misting chamber, salt removal system, salt water concentration system, air supply system, salt water feed system and water recovery chambers. The invention can also be used to concentrate the salt water by removing excess water, which increases the concentration of dissolved solids, which may result in high concentration salt water having less volume than the original low concentration salt water, which decreases the net amount of salt water volume to be disposed. The invention can be mobile or stationary. It is also understood the current invention may be utilized in other applications where it is desirable to separate solids from liquids other than oil and gas applications.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved wastewater treatment system with a solids separator, which may be easily and efficiently utilized.

It is a further object of the present invention to provide a new and improved wastewater treatment application with a separator and method, which is of a durable and reliable construction and may be utilized with multiple wells and or locations.

An even further object of the present invention is to provide a new and improved wastewater treatment system with a solids separator, which is susceptible to a low cost of manufacture with regard to both materials and labor, and which accordingly is then susceptible to low prices of sale to the consuming industry, thereby making such tool economically available to those in the field.

Still another object of the present invention is to provide a new and improved wastewater treatment system with a solids separator, which provides all of the advantages of the prior art, while simultaneously overcoming some of the disadvantages normally associated therewith.

Another object of the present invention is to provide a new and improved wastewater treatment system with a solids separator, which maximizes evaporation of water and concentrates solids for disposal, creates an opportunity for beneficial use of reclaimed solids and or reduces waste volume and weight through dewatering.

Yet another object of the present invention is to provide a new and improved wastewater treatment system with a solids separator that may be generally mobile, may be moved from site to site with existing transportation equipment and provides efficient and effective loading, offloading and transportation in general.

An even further object of the present invention is to provide a new and improved wastewater treatment system with a solids separator, which improves the evaporation process in general, is environmentally friendly and provides the opportunity to reuse condensed water.

Still another object of the present invention is to provide a new and improved wastewater treatment system with a solids separator, which reduces risky, high-cost handling; increases production through shut-down avoidance; and improves cost management predictability.

Yet still another object of the present invention is to provide a new and improved wastewater treatment system with a solids separator, which may be utilized in aspects of oil and gas operations as well as other applications where it is desirable to remove solids from wastewater or water in general.

Still another object of the present invention is to provide a new and improved wastewater treatment system with a solids separator, which has a relatively small foot print as well as ease of start-up.

An even further object of the present invention is to provide a new and improved wastewater treatment system with a solids separator that may recover a portion of the evaporated water vapor to be used as fresh water with low or no dissolved solids or suspended solids.

These, together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS AND APPENDICES

The invention will be better understood and objects other than those set forth above will become apparent when consideration is given to the following detailed description thereof. Such description makes reference to the annexed pictorial illustrations, graphs, drawings and appendices wherein.

DETAILED DESCRIPTION OF THE PREFERRED EMBODIMENTS

Figure 1:
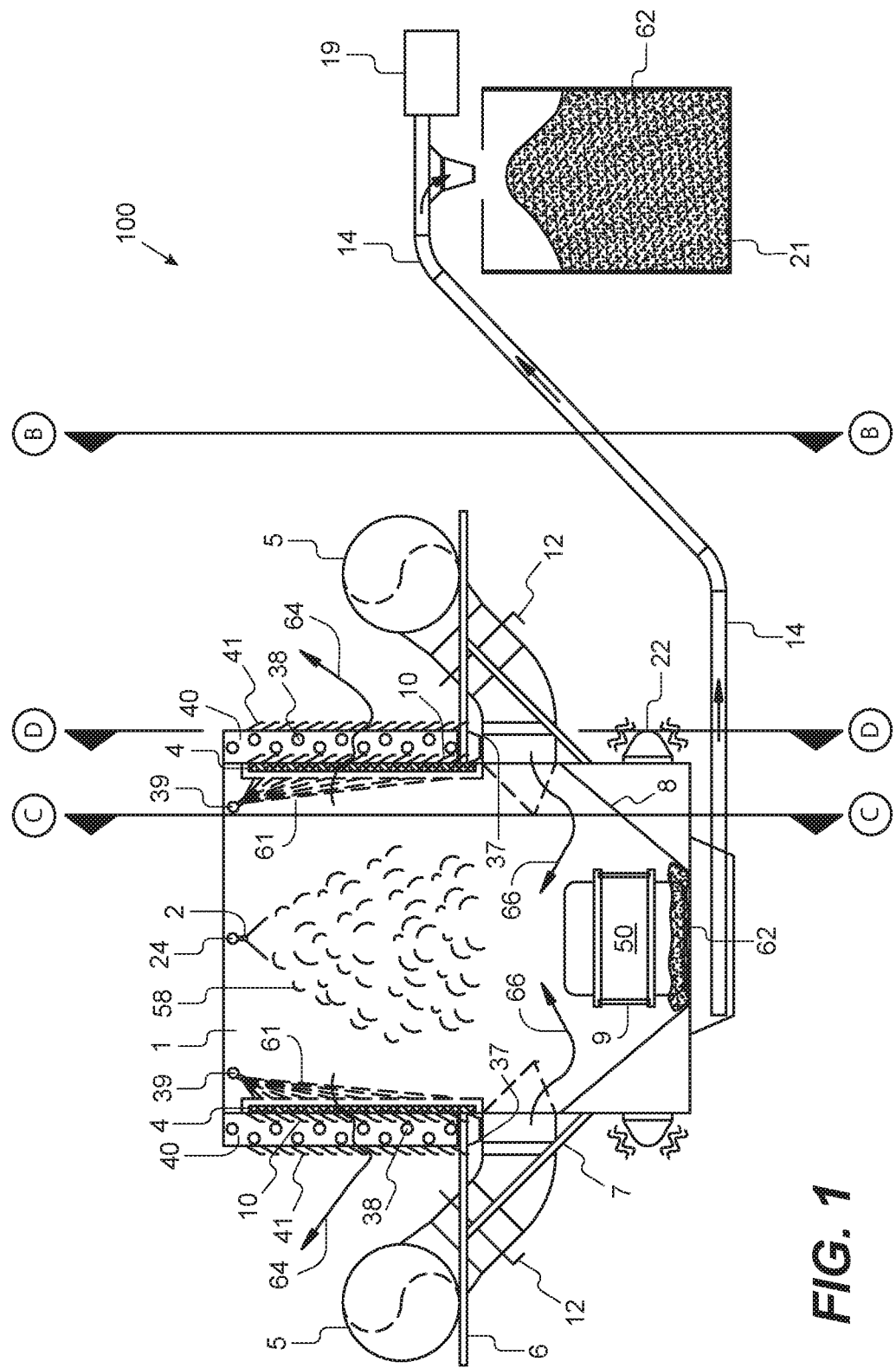
FIG. 1 is a general partial cut away illustration of a preferred embodiment of the invention taken along the view line A-A from FIG. 2, FIG. 3 and FIG. 4.
Figure 2:
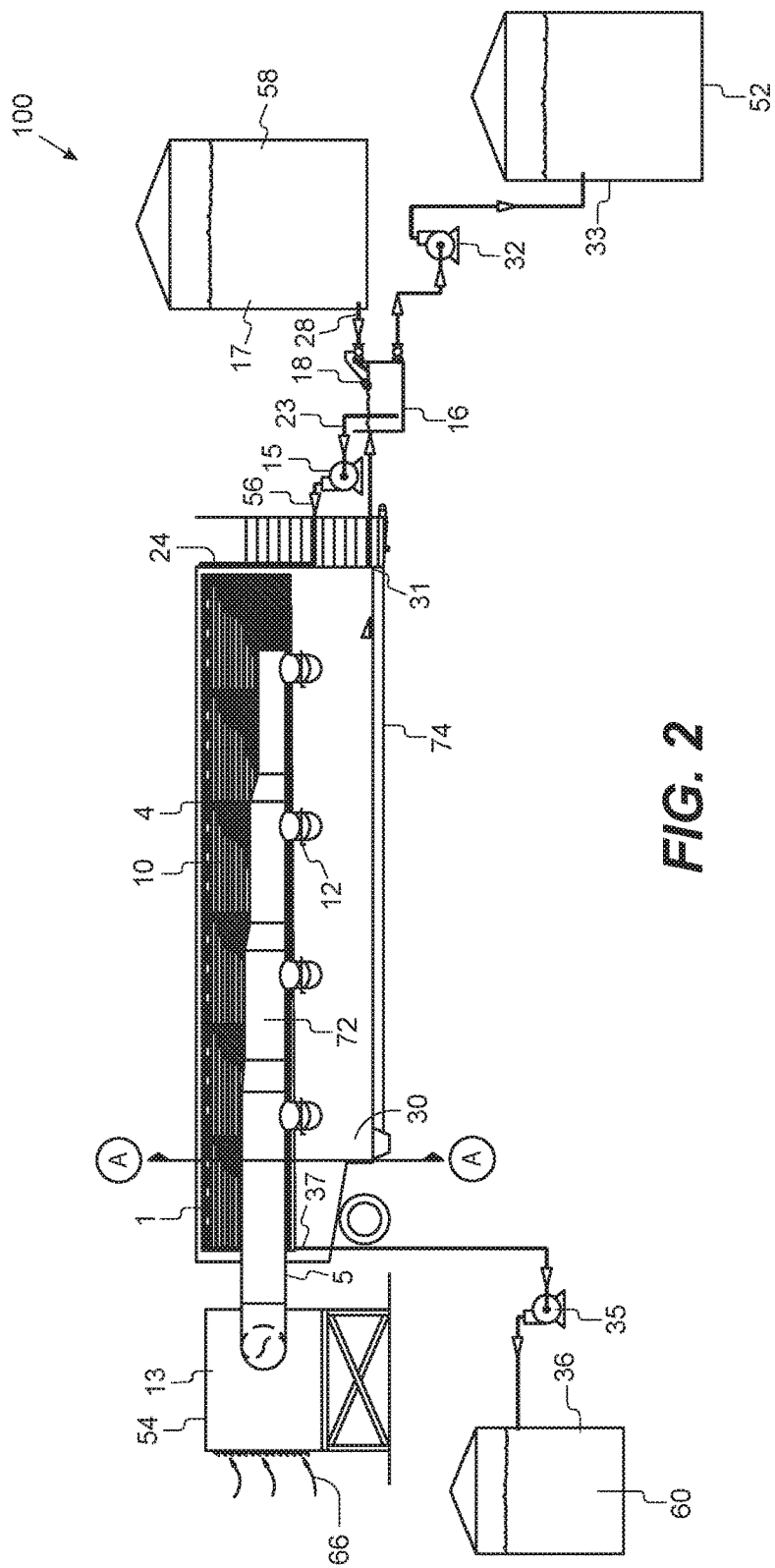
FIG. 2 is a general partial cut away illustration of a preferred embodiment of the invention taken along the view line B-B from FIG. 1.
Figure 3:
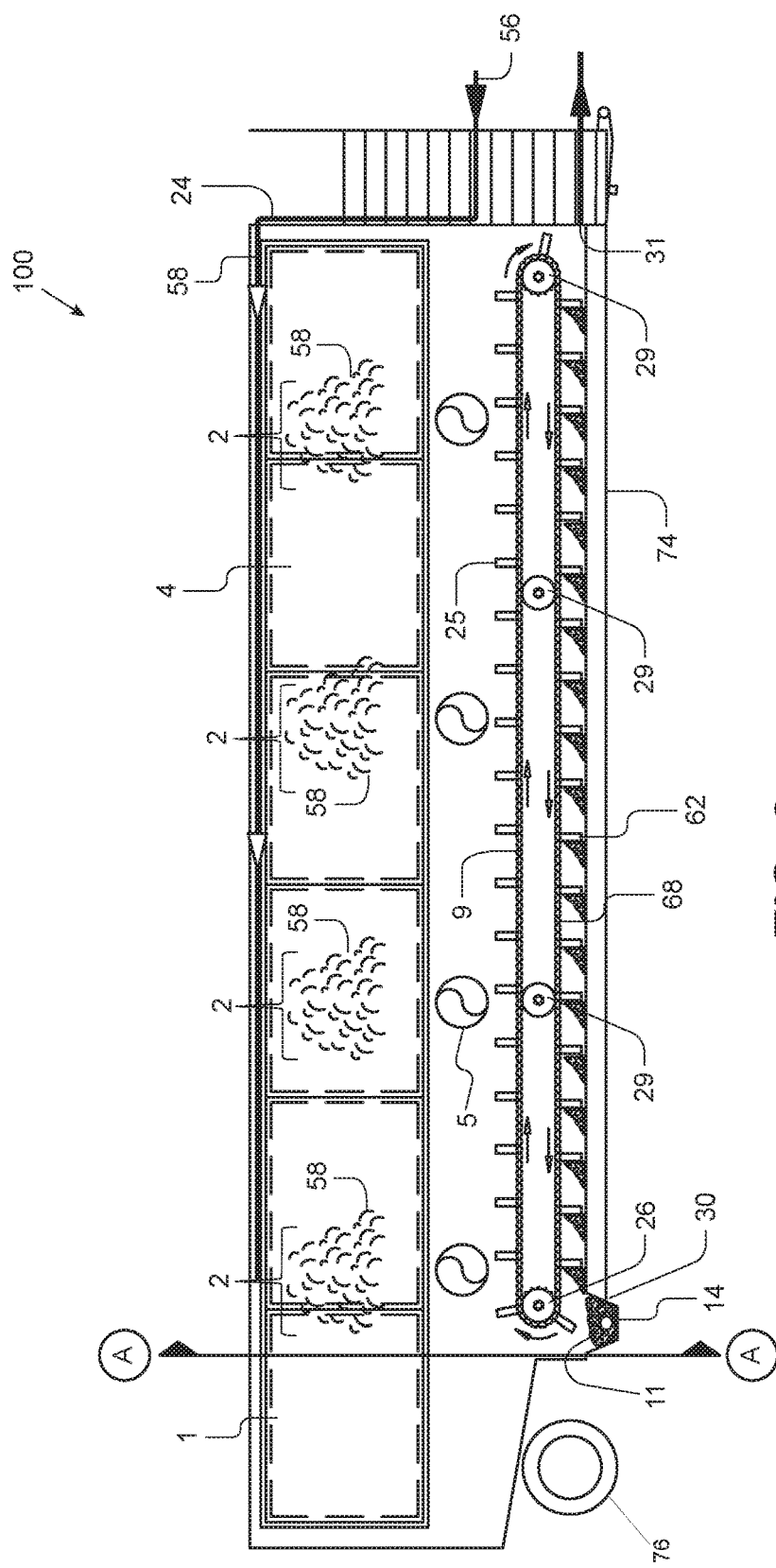
FIG. 3 is a general partial cut away illustration of a preferred embodiment of the invention taken along the view line C-C from FIG. 1.
Figure 4:
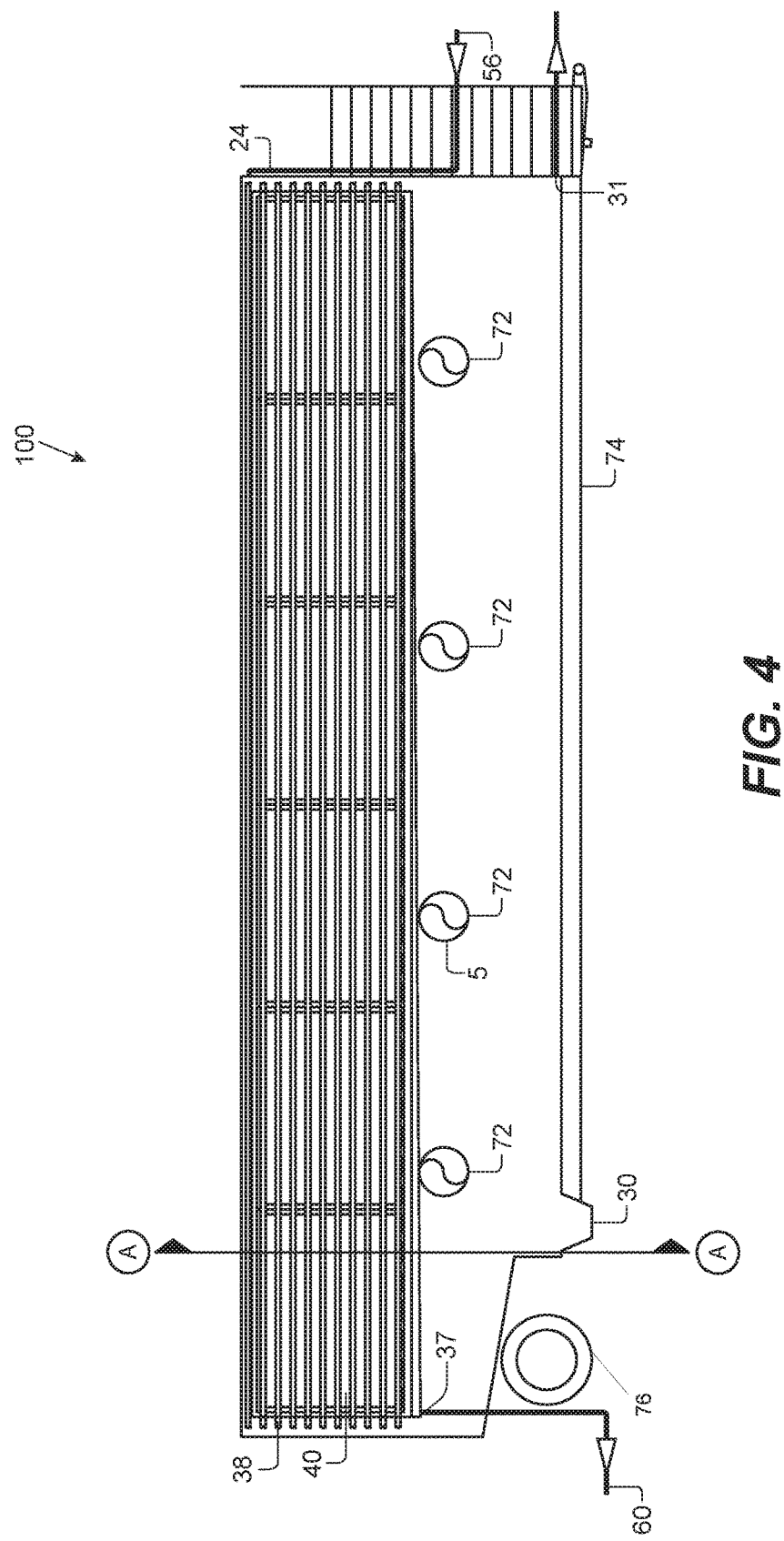
FIG. 4 is a general partial cut away illustration of a preferred embodiment of the invention taken along the view line D-D from FIG. 1.

Referring to the illustrations, drawings, and pictures and to FIG. 1 in particular, reference character 100 generally designates a new and improved apparatus, system and method of using same constructed in accordance with the present invention. Invention 100 is generally used with wastewater associated with oil and gas operations. It is understood that invention 100 may be utilized in numerous other applications where it is desirable to treat wastewater and the current invention should not be considered limited to just oil and gas applications. It is, therefore, understood that the current invention may be utilized with multiple applications such as but not limited to desalinization, salt generation, hazardous waste disposal or concentration, frac water concentration or disposal, drilling fluid concentration or disposal, brine concentration or disposal, contaminated water disposal or concentration, water concentration or disposal and many other industrial or commercial uses.

Generally referring to FIGS. 1 through 4, invention 100 may include but is not limited to misting chamber 1, solids 62 removal system 50, waste water 58 concentration system 52, air supply system 54, waste water 58 feed system 56, water 60 recovery chambers 40, and combinations thereof. In a preferred embodiment, invention 100 may be utilized in solids 62 removal mode and or waste water 58 concentration mode as will be discussed further below. The terms "waste water" and "salt water" should be considered essentially synonymous and the invention is not limited to just "salt water".

Misting Chamber 1

Misting chamber 1 may be a tank and or other container. Wastewater 58 is generally water 60 with solids 62 therein such as but not limited to salt. It is understood that other forms of liquid may be utilized and invention should not be considered limited to salt water. Wastewater 58 may be introduced via misting nozzles 2. The wastewater 58 may be misted in misting chamber 1, wherein water 60 from the wastewater 58 is evaporated. It is understood that when water 60 evaporates, a moisture laden vapor 64 is created leaving behind the solids 62. Air 66 may be introduced into the misting chamber 1 via air supply duct 5. Air 66 can be optionally heated to increase the evaporation rate.

Moisture laden vapor 64 may exit misting chamber 1 via air filters 4 and dissipates into the atmosphere or enters the optional water 60 recovery chamber 40. Air filters 4 may prevent any non-evaporated waste water 58 droplets from exiting the misting chamber 1. Filter louvers 10 may protect the air filters 4 from becoming wet from rain and snow. Solids 62 will slowly collect on the air filters 4 during the course of operations, which may partially block the flow of the moisture laden vapor 64 exiting the misting chamber 1. It is contemplated to remove the solids 62 from the air filters 4 with pressurized fluid 61 and or low concentration waste-water 58 introduced to the air filters 4 to dissolve the solids 62 and or drain to the bottom of the misting chamber 1. In a preferred embodiment, but not to be considered limited thereto, it is contemplated to spray the air filters 4 with cleaning nozzles 39, which are fed with pressurized fluid 61, which may be low concentration wastewater 58, cleaned and or fresh water 60 accumulated from invention 100, and or other waters sources until an adequate amount of solids 62 are removed from air filter 4.

Misting chamber 1 may have a floor and or bottom 8 with a slope 74. It is understood that misting chamber 1 may have a transportation system 76 that may include wheels, trailer components, trailer hitches, and so forth. Misting chamber 1 may be constructed from a modified mobile water tank as known in the art. The invention 100 can be mobile or stationary. It is contemplated that all elements of invention 100 may be mobile unit(s) that may be wheeled and or transported to the oil well site or any other location by means known in the art.

Water 60 Recovery Chambers 40

In a preferred embodiment, an optional water 60 recovery chambers 40 may condense the moisture laden vapor 64 to form water 60. The moisture laden vapor 64 may enter the water 60 recovery chambers 40 from the filter louvers 10. Condensing tubes 38 may be located inside the water 60 recovery chambers 40. Cooling media, such as air 66 and or liquid, is pumped through the condensing tubes 38. When the moisture laden vapor 64 makes contact with the cool condensing tubes 38, a portion of the water laden vapor 64 condenses to form liquid water 60. The liquid water 60 may be collected in bottom 8 of the water 60 recovery chambers 40 and sloped to drain 37 by bottom 8 slope 74 and pumped using fresh water pump 35, and or other known means in the art, to fresh water tank 36. Air 66 and or vapor 64 may then exit the water 60 recovery chambers 40 via louvers 41 and dissipates into the atmosphere.

Solids 62 Removal System 50

When operating in solids 62 removal mode, the solids 62 need to be removed as the solids 62 accumulate in the misting chamber 1. In a preferred embodiment, based on a timer, the solids 62 removal cycle may begin. In a preferred embodiment, the waste water 58 feed system 56, discussed further below, may be deactivated while the air supply system 54, also discussed further below, may remain activated. This may allow the solids 62 inside misting chamber 1 to dry. After the drying period is complete, vibrators 22 may be energized to promote the movement of the solids 62 downward via gravity. The solids 62 may be collected in the bottom 8 of misting chamber 1. The angled bottom 8 of the misting chamber 1 funnels the solids 62 into drag conveyor 9. Drag conveyor 9 may be powered by rotating drive sprocket 26. Idle sprockets 29 keep drag conveyor 9 chain 68 tight and aligned. When the drag conveyor 9 is engaged, drag conveyor 9 paddles 25 move solids 62 to end 30 of the misting chamber 1, where the solids 62 may fall through opening 11 into flexible screw conveyor 14. Flexible screw conveyor 14 drive 19 rotates the flexible screw conveyor 14. The solids 62 may be conveyed to tote 21 for removal. Other solids 62 conveying methods are contemplated to remove the solids 62 from the misting chamber 1.

Waste Water 58 Concentration System 52

When operating in waste water 58 concentration mode, the flow of waste water 58 to the misting nozzles 2 and the flow of air 66 from the air supply duct 5 may be adjusted to allow only a portion of the waste water 58 to evaporate. The portion of the waste water 58 in the misting chamber 1 that did not evaporate may fall to the bottom 8 of the misting chamber 1 and is drained to waste water 58 holding tank 16 to be recirculated into the misting chamber 1 via waste water 58 misting pump 15. The waste water 58 may be recirculated until the desired concentration of waste water 58 is reached by monitoring the net decrease of waste water 58 in the waste water 58 holding tank 16 or by utilizing total dissolved solids 62 instruments in the waste water 58 holding tank 16 or by using other methods known in the art. The high concentration waste water 58 is then pumped to high concentration waste water 58 tank 33 via high concentration waste water 58 pump 32 or by other means known in the art. The high concentration waste water 58 may then be removed and disposed of using traditional or industry standard methods known in the art. After the high concentration waste water 58 has been pumped out of the waste water 58 holding tank 16, float valve 18 may open, allowing a new batch of low concentration waste water 58 to flow from low concentration waste water 58 storage tank 17 to the waste water 58 holding tank 16 using gravity flow or other means known in the art. Multiple configurations are contemplated for emptying and refilling waste water 58 holding tank 16. After waste water 58 holding tank 16 is full, float valve 18 may be closed.

Air 66 Supply System 54

Fan unit 13 may pull in outside air 66, heat air 66, and then deliver pressurized air 66 into misting chamber 1 via the air 66 supply duct 5. It is contemplated that the air 66 flow provided by fan unit 13 may be approximately 22,000 cubic feet per minute, but the air 66 flow may be more or less. The air 66 may be injected into the misting chamber 1 via multiple supply duct 5 branch 72. The air 66 flow for each branch 72 can be balanced and controlled using air dampers 12, which may be installed at each duct 5 branch 72. The air 66 supply duct 5 may be supported by members 6 and members 7. The amount of heat added to the air 66 can be varied based on the quality of the outside air. If the outside air is warm and has a low relative humidity, no heat may be required. In this condition, the fan unit 13 may supply the unheated air 66 into the misting chamber 1. It is contemplated that in hot, low humidity environments, little or no heat may be required. It is also contemplated that in higher humidity environments, approximately 4,000,000 BTU per hour of heat may be added to the air 66 stream from fan unit 13. The heating amount may be more or less. The fuel source for the heat may vary, but it is contemplated that it could be gas from the oil well, which may contain methane, propane, butanes, ethane, or other materials.

Waste Water 58 Feed System 56

When operating in solids 62 removal mode, the waste water 58 originates in the waste water 58 storage tank 17. Discharge hose 28 may supply waste water 58 to the waste water 58 holding tank 16. The waste water 58 level in the waste water 58 holding tank 16 may be automatically maintained by the float valve 18. When the waste water 58 level drops, the float valve 18 may be opened, allowing waste water 58 to flow via gravity into the waste water 58 holding tank 16. When the waste water 58 fills the waste water 58 holding tank 16, the float valve 18 may close, causing the flow from the waste water 58 storage tank 17 to cease.

The waste water 58 may flow from the waste water 58 holding tank 16 to the waste water 58 misting pump 15 via a suction hose 23. High pressure waste water 58 may be delivered to the misting nozzles 2 via discharge hose 24. It is contemplated that the flow rate of waste water 58 to the misting nozzles 2 may be approximately 15 gallons per minute, but the flow rate may be more or less.

Any waste water 58 that does not evaporate in the misting chamber 1, may fall to the bottom 8 of the misting chamber 1 and may be directed to drain 31 via slope 74 of the misting chamber 1. The waste water 58 may flow back to the waste water 58 holding tank 16, which may allow the waste water 58 to be recirculated back into the misting chamber 1.

In Operation

Invention 100 contemplates waste water 58 is misted in the misting chamber 1 via a waste water 58 misting pump 15 and misting nozzles 2. Outside air 66 is introduced into the misting chamber 1 via the air supply duct 5 and fan unit 13 to promote the evaporation process. The air 66 may be optionally heated inside fan unit 13, which may promote higher rates of evaporation in the misting chamber 1. The moisture laden vapor 64 may exit the misting chamber 1 via the air filters 4. The air filters 4 may hinder airborne waste water 58 droplets, that are not evaporated, from exiting the misting chamber 1.

The moisture laden vapor 64 may be a mixture of air 66 and evaporated water. After the moisture laden vapor 64 passes through the air filters 4, the moisture laden vapor 64 enters the optional water 60 recovery chambers 40. When the moisture laden vapor 64 makes contact with the condensing tubes 38, some of the water 60 is condensed from the vapor 64 in liquid form, which may be drained and delivered to the water 60 fresh water tank 36 via the water 60 fresh water pump 35 or by other means.

Solids 62 Removal Mode

Invention 100 may generally have different modes of operation. One contemplated may be solids 62 removal mode, when the waste water 58 evaporates in the misting chamber 1 and the dissolved solids 62, such as but not limited to salts, remain in the misting chamber 1. The solids 62 are removed from the misting chamber 1 via drag conveyor 9. The solids 62 are then conveyed via flexible screw conveyor 14 to tote 21 for removal. The waste water 58 in the misting chamber 1 that does not evaporate may fall to the bottom 8 of the misting chamber 1 and be drained to the waste water 58 holding tank 16 to be recirculated into the misting chamber 1 via the waste water 58 misting pump 15. The waste water 58 holding tank 16 may be automatically filled by the waste water 58 storage tank 17.

Waste Water 58 Concentration Mode

In another preferred embodiment, invention 100 may be utilized in waste water 58 concentration mode wherein a portion of the waste water 58 in the misting chamber 1 that did not evaporate falls to the bottom 8 of the misting chamber 1 and is drained to the waste water 58 holding tank 16 to be recirculated into the misting chamber 1 via the waste water 58 misting pump 15. The waste water 58 is recirculated until the desired concentration of waste water 58 is reached. The high concentration waste water 58 is then pumped to the high concentration waste water 58 tank 33 via the high concentration waste water 58 pump 32, or by other means. The high concentration waste water 58 may then be removed and disposed of using traditional methods known in the art. After the high concentration waste water 58 has been pumped out of the waste water 58 holding tank 16, the float valve 18 may open to deliver a new batch of low concentration waste water 58 from the low concentration waste water 58 storage tank 17 to the waste water 58 holding tank 16.

A Preferred Embodiment

Invention 100 therefore contemplates a wastewater treatment chamber for removing or partial removing solids from said wastewater comprising: an interior; a front side having an inlet for said wastewater to be processed, an outlet for condensed wastewater that has been processed, and a towing hitch adapted to tow said chamber; a first side with a first louvered opening having a first filter on said interior of said chamber and adapted to pass evaporated water there through; a second side with a second louvered opening having a second filter on said interior of said chamber and adapted to pass evaporated water there through; a back side having wheels adapted for towing said chamber; a top side; at least one mister positioned in said interior on said top side and in communication with said inlet for said wastewater and adapted to mist said wastewater wherein solid are removed from said wastewater creating said evaporated water; a bottom side sloped downward from front side to back side having a first outlet for accumulated said solids and adapted to pass said solids from said bottom out of said interior of said chamber; and at least one air inlet for passing air into said interior of said chamber wherein said air is heated with a heater.

Invention 100 also contemplates a wastewater treatment chamber 1 further comprising a clean water recovery system having: a first water recovery tank with a first condenser positioned on said interior between said first louvered opening and said first filter and adapted to condense said evaporated water into water and collect said water; a second recovery tank with a second condenser positioned on said interior between said second louvered opening and said second filter and adapted to condense said evaporated water into water and collect said water; and a second outlet from said interior in communication with said first water recovery tank and said second water recovery tank for removing said water from said interior.

Invention 100 still further contemplates a wastewater treatment system comprising: a tank for holding wastewater having solids wherein said tank has an inlet for receiving a supply of said wastewater and an outlet for removing said wastewater from said tank; an evaporation system having an inlet for receiving said wastewater from said outlet of said tank, a chamber for holding said wastewater, a mister for dispersing said wastewater into said chamber, an air inlet into said chamber causing evaporation of said wastewater, and an air filter outlet for said evaporation to escape said chamber, leaving behind said solids; and a separating system having an inlet to receive said unevaporated wastewater and said solids from said chamber outlet, wherein said wastewater is moved back into said tank and said solids are removed through said outlet of said separating system.

Whereas, the present invention has been described in relation to the drawings attached hereto, it should be understood that other and further modifications, apart from those shown or suggested herein, may be made within the spirit and scope of this invention. Changes may be made in the combinations, operations, and arrangements of the various parts and elements described herein without departing from the spirit and scope of the invention.

What is claimed is:

1. A wastewater treatment chamber for removing or partially removing solids from said wastewater comprising:
   an interior;
   a front side having an inlet for said wastewater to be processed, an outlet for condensed wastewater that has been processed, and a towing hitch adapted to tow said chamber;
   a first side with a first louvered opening having a first filter on said interior of said chamber and adapted to pass evaporated wastewater there through;
   a second side with a second louvered opening having a second filter on said interior of said chamber and adapted to pass evaporated wastewater there through;
   a back side having wheels adapted for towing said chamber;
   a top side;
   at least one mister positioned in said interior on said top side and in communication with said inlet for said wastewater and adapted to mist said wastewater wherein solids are removed from said wastewater creating said evaporated wastewater;
   a bottom side sloped downward from front side to back side having a first outlet for said solids and adapted to pass said solids from said bottom of said interior of said chamber by vibrators promoting the movement of said solids downward via gravity and said solids are collected into a drag conveyor at said bottom out of said interior of said chamber and said drag conveyor contains paddles and said drag conveyor is powered by a rotating drive sprocket and when activated said drag conveyor and said paddles move said solids toward said backside of said chamber, where said solids may fall through an opening into a flexible screw conveyor which is powered by a flexible screw conveyor drive that rotates said flexible screw conveyor and conveys said solids for removal from said chamber; and
   at least one air inlet for passing air into said interior of said chamber.

2. The wastewater treatment chamber of claim 1 further comprising a clean water recovery system having:
   a first water recovery tank with a first condenser positioned on said interior between said first louvered opening and said first filter and adapted to condense said evaporated water into water and collect said water;
   a second water recovery tank with a second condenser positioned on said interior between said second louvered opening and said second filter and adapted to condense said evaporated water into water and collect said water; and
   a second outlet from said interior in communication with said first water recovery tank and said second water recovery tank for removing said water from said interior.

3. The wastewater treatment chamber of claim 1 further comprising a heater for heating said air.

* * * * *